United States Patent
Mizuno et al.

(10) Patent No.: US 12,444,769 B2
(45) Date of Patent: Oct. 14, 2025

(54) SOLID-STATE BATTERY

(71) Applicant: TOYOTA JIDOSHA KABUSHIKI KAISHA, Toyota (JP)

(72) Inventors: Fuminori Mizuno, Miyoshi (JP); Shinya Shiotani, Nagoya (JP); Takamasa Ohtomo, Miyoshi (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 120 days.

(21) Appl. No.: 18/588,425

(22) Filed: Feb. 27, 2024

(65) Prior Publication Data
US 2024/0250297 A1 Jul. 25, 2024

Related U.S. Application Data

(63) Continuation of application No. 17/751,892, filed on May 24, 2022.

(30) Foreign Application Priority Data

Jul. 2, 2021 (JP) ................................. 2021-111043

(51) Int. Cl.
*H01M 10/0562* (2010.01)
*H01M 4/46* (2006.01)
(Continued)

(52) U.S. Cl.
CPC ....... *H01M 10/0562* (2013.01); *H01M 4/463* (2013.01); *H01M 4/661* (2013.01); *H01M 10/0585* (2013.01); *H01M 50/533* (2021.01)

(58) Field of Classification Search
CPC ........... H01M 10/0562; H01M 50/533; H01M 10/0585
(Continued)

(56) References Cited

U.S. PATENT DOCUMENTS 6,376,128 B1  4/2002  Goto
2016/0329602 A1* 11/2016 Kojima ................ B23K 26/361
(Continued)

FOREIGN PATENT DOCUMENTS

CN  1264928 A   8/2000
JP  2000-243430 A  9/2000
(Continued)

OTHER PUBLICATIONS

May 23, 2025 Office Action issued in U.S. Appl. No. 17/751,892.
Nov. 7, 2024 Office Action issued in U.S. Appl. No. 17/751,892.

*Primary Examiner* — Allison Bourke
*Assistant Examiner* — Robert Gene West
(74) *Attorney, Agent, or Firm* — Oliff PLC

(57) ABSTRACT

A solid-state battery includes: a first current collector layer having a first current collector tab protruding from one side of a quadrilateral; a first active material layer laminated on the first current collector layer; a second current collector layer having a second current collector tab protruding from one side of a quadrilateral; a second active material layer laminated on the second current collector layer; and a solid electrolyte layer arranged between the first active material layer and the second active material layer and including a polymer electrolyte, wherein, in three sides other than the one side where the first current collector tab is arranged, the solid electrolyte layer is arranged so as to cover end surfaces of the first current collector layer and the first active material layer.

4 Claims, 13 Drawing Sheets

(51) Int. Cl.
*H01M 4/66* (2006.01)
*H01M 10/0585* (2010.01)
*H01M 50/533* (2021.01)

(58) Field of Classification Search
USPC .......................................................... 429/304
See application file for complete search history.

(56) References Cited

U.S. PATENT DOCUMENTS

| | | |
|---|---|---|
| 2018/0248228 A1 | 8/2018 | Honda |
| 2019/0334205 A1 | 10/2019 | Waseda |
| 2019/0348717 A1 | 11/2019 | Kato et al. |
| 2020/0343591 A1* | 10/2020 | Ohta .................. H01M 50/466 |
| 2021/0305664 A1 | 9/2021 | Koga |

FOREIGN PATENT DOCUMENTS

| | | |
|---|---|---|
| JP | 2014-235990 A | 12/2014 |
| JP | 2017-073374 A | 4/2017 |
| JP | 2018-142534 A | 9/2018 |
| JP | 2019-192610 A | 10/2019 |
| JP | 2020-181668 A | 11/2020 |
| WO | 2014/050500 A1 | 4/2014 |

* cited by examiner

SOLID-STATE BATTERY

RELATED APPLICATIONS

The present application is a continuation application of U.S. application Ser. No. 17/751,892 filed May 24, 2022, which claims priority to Japanese Patent Application No. 2021-111043 filed Jul. 2, 2021. The entirety of each of these prior applications is incorporated herein by reference.

TECHNICAL FIELD

The present disclosure relates to a solid-state battery.

BACKGROUND

Patent Document 1 discloses a solid-state battery having a resin layer covering a side surface of a solid-state battery stack, and shows that a sulfide solid electrolyte is used.

Patent Document 2 discloses a bipolar type lithium ion battery having a bipolar electrode current collector in which a first current collector, an adhesive resin layer having a through hole, and a second current collector are stacked in this order, and the first current collector and the second current collector are bonded by using the adhesive resin layer.

Patent Document 3 discloses a configuration in which a solid electrolyte material made of a sulfide solid electrolyte material or an oxide solid electrolyte material is contained in an insulating portion of a solid electrolyte layer and a side surface of a stack.

Patent Document 4 discloses a configuration in which a solid electrolyte layer and a side surface of a stack are formed of the same member.

CITATION LIST

Patent Documents

[Patent Document 1] JP 2019-192610 A
[Patent Document 2] JP 2017-073374 A
[Patent Document 3] JP 2014-235990 A
[Patent Document 4] JP 2018-142534 A

SUMMARY OF THE INVENTION

Problems to be Solved by the Invention

In solid-state batteries, cycle characteristics (e.g., capacity retention) decrease due to a volume change of a negative electrode active material during charging and discharging. This is because it is difficult to maintain mechanical characteristics of a sulfide solid electrolyte against expansion and contraction of the negative electrode active material caused by charging and discharging, and peeling or cracking occurs at an interface between a negative electrode layer and a solid electrolyte layer, at an interface between the negative electrode active material and the solid electrolyte layer, or inside of the solid electrolyte layer.

Accordingly, it is an object of the present disclosure to provide a solid-state battery capable of improving cycle characteristics in view of the aforementioned problems.

Means for Solving the Problems

In solid-state batteries, the bonding state of an interface significantly affects cell performance because ions and electrons are conducted by using an interface between a solid and a solid. Meanwhile, when expansion and contraction (a volume change) of an active material occur with charging and discharging, a good bonding state is not maintained at the interface, and the resistance may increase in some cases.

For example, while a Si-based active material is known as a negative electrode active material having a high capacity, its volume change caused by charging and discharge is significant. In order to suppress deterioration in battery performance caused by expansion and contraction of the negative electrode active material, the inventors considered use of a soft polymer electrolyte as a solid electrolyte for the negative electrode layer. However, since the ionic conductivity of the polymer electrolyte is lower than that of an inorganic solid electrolyte in many cases, it is assumed that the inorganic solid electrolyte is used for a positive electrode layer from the viewpoint of improving the battery performance. Therefore, by using the polymer electrolyte and the inorganic solid electrolyte in combination, excellent battery performance can be obtained while suppressing deterioration in the bonding state of the interface between the solid and the solid in the negative electrode layer.

However, the inventors have found that, when one of the positive electrode layer and the negative electrode layer of the solid-state battery contains an inorganic solid electrolyte, and the other contains a polymer electrolyte, the layer containing the inorganic solid electrolyte (e.g., the positive electrode layer) becomes a hard layer, and the layer containing the polymer electrolyte (e.g., the negative electrode layer) becomes a soft layer because the inorganic solid electrolyte is typically harder than the polymer electrolyte. As a result, when each layer is pressed for bonding, the layer containing the polymer electrolyte is easily deformed (e.g., extended and warped). When such deformation occurs, and the positive electrode layer and the negative electrode layer come into contact with each other, an internal short circuit occurs, and cycle characteristics are degraded.

In view of the findings described above, the present application discloses a solid-state battery comprising: a first current collector layer having a first current collector tab protruding from one side of a quadrilateral; a first active material layer laminated on the first current collector layer; a second current collector layer having a second current collector tab protruding from one side of a quadrilateral; a second active material layer laminated on the second current collector layer; and a solid electrolyte layer arranged between the first active material layer and the second active material layer and including a polymer electrolyte, wherein, in three sides other than the one side where the first current collector tab is arranged, the solid electrolyte layer is arranged so as to cover end surfaces of the first current collector layer and the first active material layer.

In the solid-state battery described above, the second current collector layer, the second active material layer, the solid electrolyte layer, the first active material layer, the first current collector layer, the first active material layer, the solid electrolyte layer, the second active material layer, and the second current collector layer may be laminated in this order to form a power generating element.

In the solid-state battery described above, end surfaces of the second current collector layer and the second active material layer may be covered with the solid electrolyte layer on at least one side other than the side where the second current collector tab is arranged. In addition, a plurality of the power generating elements may be stacked, and the plurality of the power generating elements may be bonded by the solid electrolyte layer covering the end surfaces of the second current collector layer and the second active material layer.

Advantageous Effects

In the solid-state battery of the present disclosure, a short circuit does not easily occur even when a polymer electrolyte is used for a negative electrode active material layer. Therefore, it is possible to use the polymer electrolyte for the negative electrode active material layer. As a result, it is possible to suppress peeling or cracking inside of a negative electrode layer or at an interface between the negative electrode layer and a solid electrolyte layer during charging and discharging, and obtain excellent cycle characteristics.

MODES FOR EMBODYING THE INVENTION

1. Power Generating Element

A solid-state battery of the present disclosure includes one or more power generating elements that are stacked and are unit elements capable of generating electricity as a single cell, and the power generating elements are housed in an exterior casing (not shown) to form a battery having a desired capacity. First, the power generating element will be described.

Figure 1:
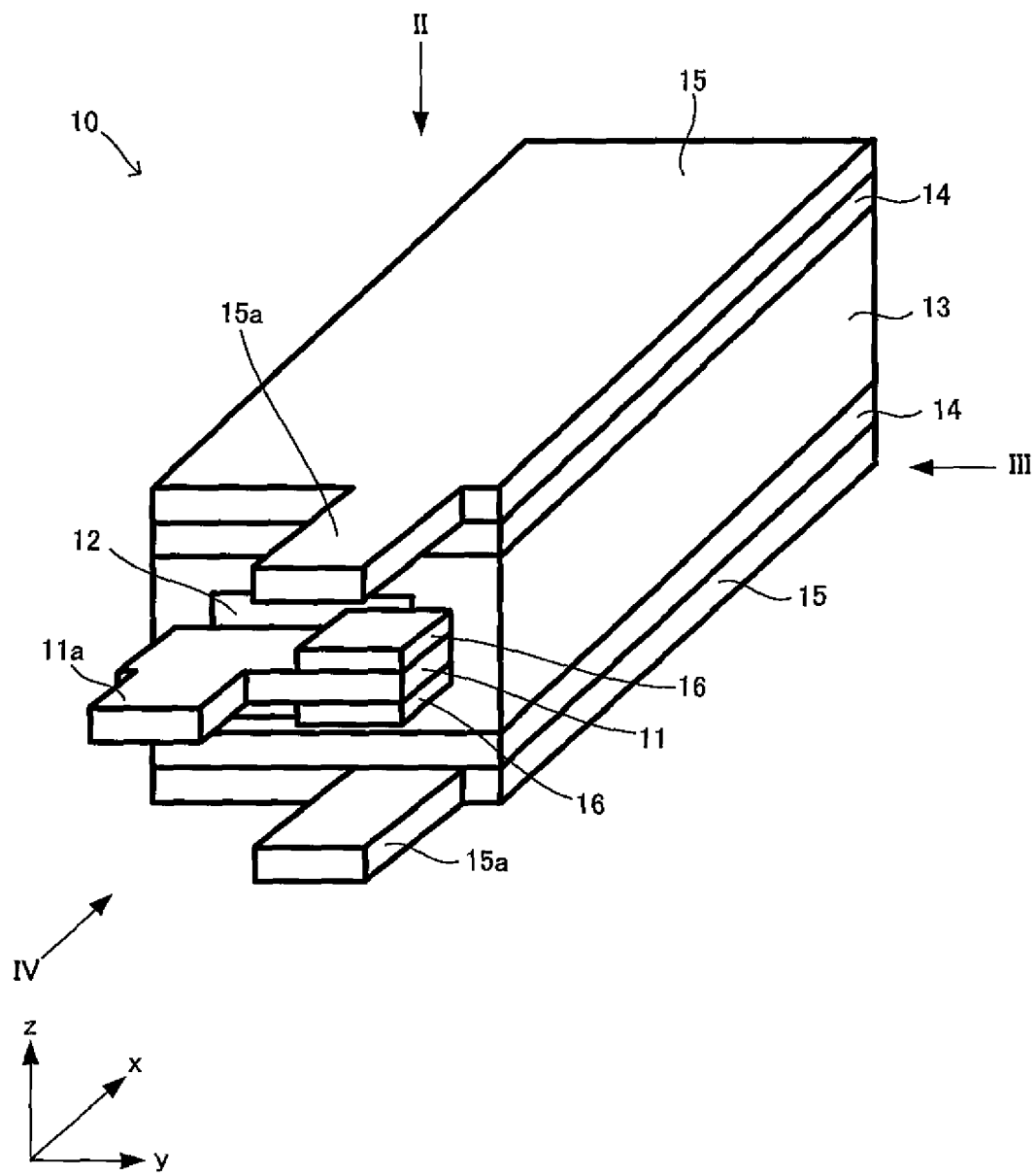
FIG. 1 is an exterior perspective view illustrating a power generating element 10.
Figure 2:
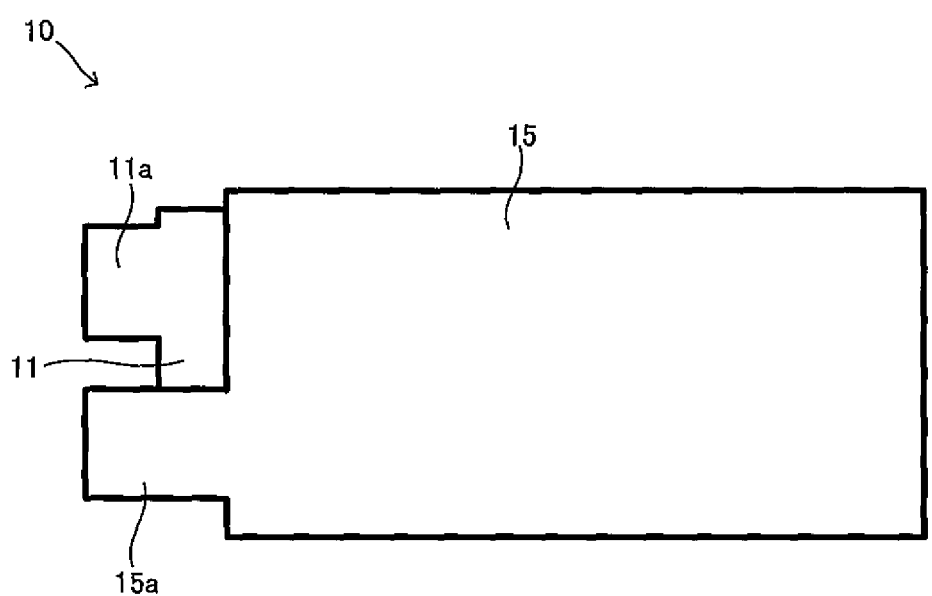
FIG. 2 is a plan view illustrating the power generating element 10.
Figure 2:
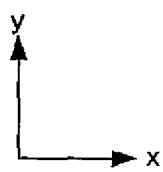
Figure 3:
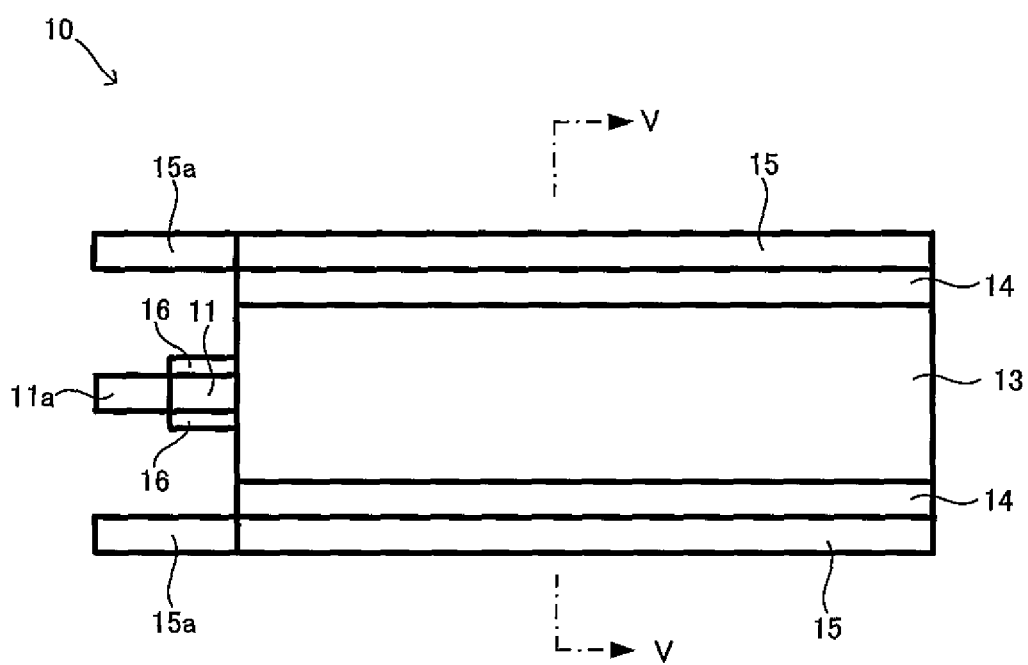
FIG. 3 is a front view illustrating the power generating element 10.
Figure 3:
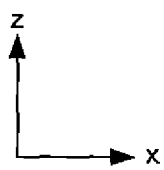
Figure 4:
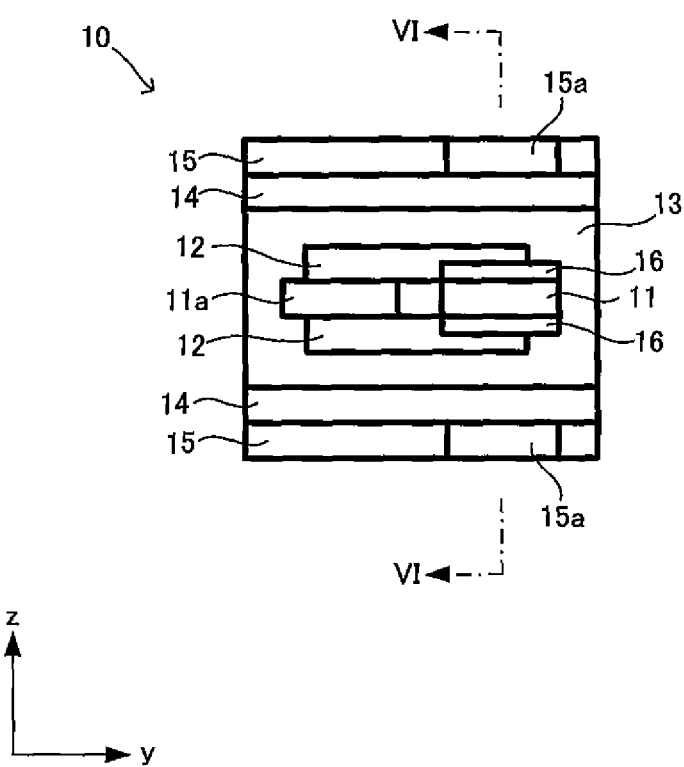
FIG. 4 is a left side view illustrating the power generating element 10.
Figure 5:
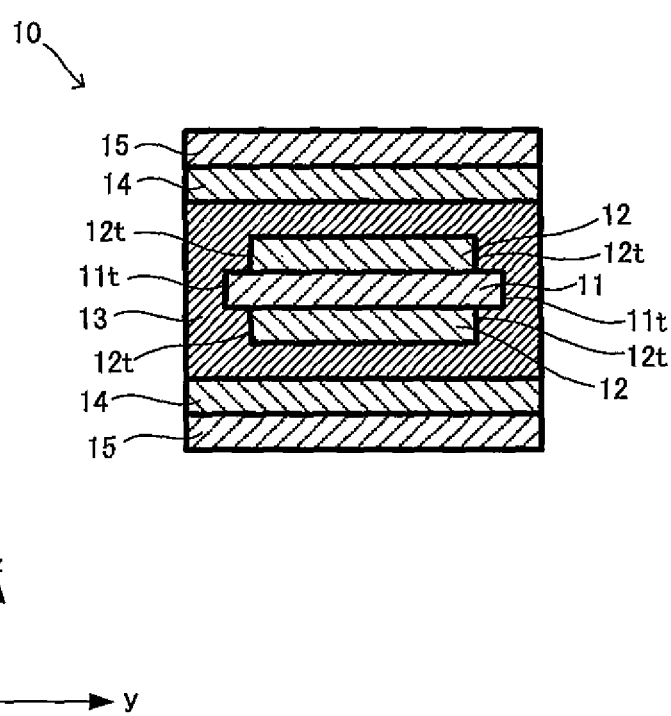
FIG. 5 is a cross-sectional view taken along arrows V-V to illustrate the power generating element 10.
Figure 6:
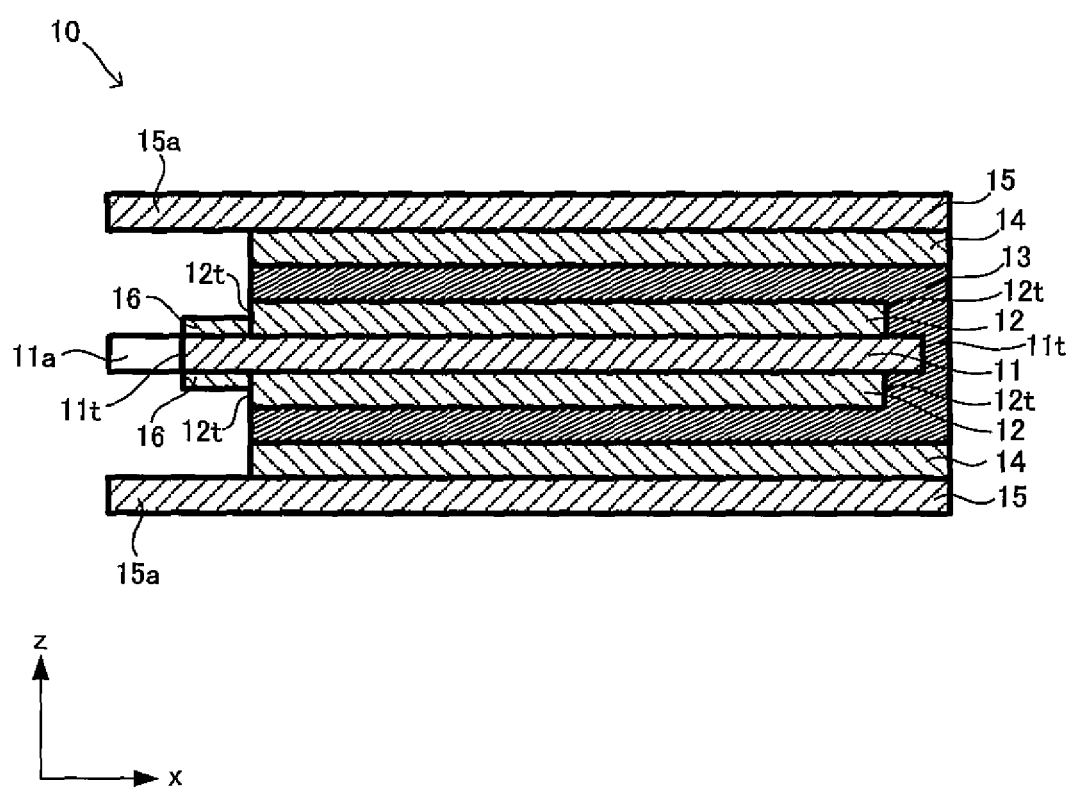
FIG. 6 is a cross-sectional view taken along arrows VI-VI to illustrate the power generating element 10.

FIGS. 1 to 6 are diagrams illustrating a power generating element 10 according to an embodiment. FIG. 1 is a perspective view illustrating the power generating element 10, FIG. 2 is a plan view illustrating the power generating element 10 (a diagram taken from a direction indicated by arrow II in FIG. 1), FIG. 3 is a front view illustrating the power generating element 10 (a diagram taken from a direction indicated by arrow III in FIG. 1), FIG. 4 is a left side view illustrating the power generating element 10 (a diagram taken from a direction indicated by arrow IV in FIG. 1), FIG. 5 is a cross-sectional view taken along arrows V-V of FIG. 3, and FIG. 6 is a cross-sectional view taken along arrows VI-VI of FIG. 4.

In FIGS. 1 to 6 and the subsequent drawings, shapes (such as thickness and width) may be exaggerated for easy understanding if necessary, and some of signs to be repeated may be omitted. In addition, for easy understanding, directions of the three-dimensional orthogonal coordinate system (x, y, z) may be shown in combination.

1.1. Constituent Members Included in the Power Generating Element

As shown in FIGS. 1 to 6, the power generating element 10 includes a negative electrode current collector layer 11, a negative electrode active material layer 12, a solid electrolyte layer 13, a positive electrode active material layer 14, a positive electrode current collector layer 15, and an insulating layer 16. Note that, in this embodiment, all of the negative electrode current collector layer 11, the negative electrode active material layer 12, the positive electrode active material layer 14, and the positive electrode current collector layer 15 are thin sheet-like members having front and back quadrilateral surfaces on the x-y plane and having a thin thickness between the front and back surfaces.

1.1a. Negative Electrode Current Collector Layer (First Current Collector Layer)

According to this embodiment, the negative electrode current collector layer 11 is one of members constituting a negative electrode stack as a first current collector layer, has a quadrilateral shape in plan view (as viewed from the viewpoint direction of FIG. 2), and is formed of metal foil, metal mesh, or the like. Particularly, the metal foil is preferable, and the metal may include Cu, Ni, Fe, Ti, Co, Zn, stainless steel, and the like. The negative electrode current collector layer 11 may have any coat layer on its surface for adjusting contact resistance. Materials constituting the coat layer may include, for example, carbon. The thickness (the size in the z-direction) of the negative electrode current collector layer 11 is not particularly limited, but is preferably 0.1 μm or larger and 1 mm or smaller, and more preferably 1 μm or larger and 100 μm or smaller.

The negative electrode current collector layer 11 includes a negative electrode current collector tab 11a which functions as a first current collector tab. The negative electrode current collector tab 11a makes it possible to easily electrically connect the negative electrode current collector layers 11 to each other. The negative electrode current collector tab 11a may be made of the same material as that of the negative electrode current collector layer 11, or may be made of a different material. In addition, the negative electrode current collector tab 11a may have the same thickness as that of the negative electrode current collector layer 11, or may have a different thickness.

According to this embodiment, the negative electrode current collector tab 11a is arranged so as to protrude in the x-direction from one side (an edge in the x-direction) of the negative electrode current collector layer 11, and its thickness (the size in the z-direction) is the same as that of the negative electrode current collector layer 11. In addition, the negative electrode current collector tab 11a has a width (the size in the y-direction) smaller than that of the negative electrode current collector layer 11.

1.1b. Negative Electrode Active Material Layer (First Active Material Layer)

According to this embodiment, the negative electrode active material layer 12 is one of the members constituting the negative electrode stack as a first active material layer, has a quadrilateral shape in plan view (as viewed from the viewpoint direction of FIG. 2), contains at least a negative electrode active material and a polymer electrolyte as a solid electrolyte in this embodiment, and may further optionally contain a conductive material and a binder.

The thickness (the size in the z-direction) of the negative electrode active material layer is set to, for example, 0.1 μm or larger and 1000 μm or smaller.

[Negative Electrode Active Material]

The negative electrode active material includes, for example, a metal active material such as Si, Sn, and Li; a carbon active material such as graphite; and an oxide active material such as lithium titanate. In addition, the negative electrode active material may include a Si-based active material containing at least Si. Since a volume change of the Si-based active material caused by charging and discharging is significant, the battery performance is easily degraded by expansion and contraction. Meanwhile, since a soft polymer electrolyte is contained, it is possible to suppress degradation of cycle characteristics of the battery caused by expansion and contraction. The Si-based active material may include, for example, Si alone, a Si alloy, and a Si oxide. The Si alloy preferably contains a Si element as a main component. The proportion of Si in the Si alloy may be, for example, 50 at % or higher, 70 at % or higher, or 90 at % or higher.

The shape of the negative electrode active material may include, for example, a particulate shape. The negative electrode active material may have an average particle size (D50) of, for example, 10 nm or larger or 100 nm or larger. Meanwhile, the average particle size (D50) of the negative electrode active material may be, for example, 50 μm or smaller or 20 μm or smaller. The average particle size (D50) may be calculated from measurement using, for example, a laser diffraction type particle size analyzer or a scanning electron microscope (SEM).

The proportion of the negative electrode active material in the negative electrode active material layer may be, for example, 20% by weight or higher, 40% by weight or higher, or 60% by weight or higher. Meanwhile, the proportion of the negative electrode active material in the negative electrode active material layer is, for example, 80% by weight or lower.

[Polymer Electrolyte]

The polymer electrolyte contains at least a polymer component. The polymer component may include, for example, a polyether-based polymer, a polyester-based polymer, a polyamine-based polymer, and a polysulfide-based polymer, among which the polyether-based polymer is preferable. This is because it provides high ionic conductivity and excellent mechanical properties such as the Young's modulus and the breaking strength.

The polyether-based polymer has a polyether structure within a recurring unit. In addition, it is preferable that the polyether-based polymer has a polyether structure within a main chain of the recurring unit. The polyether structure may include, for example, a polyethylene oxide (PEO) structure and a polypropylene oxide (PPO) structure. The polyether-based polymer preferably has the PEO structure as a main recurring unit. In the polyether-based polymer, the proportion of the PEO structure in all recurring units may be, for example, 50 mol % or higher, 70 mol % or higher, or 90 mol % or higher. In addition, the polyether-based polymer may include, for example, a homopolymer or a copolymer of an epoxy compound (such as an ethylene oxide and a propylene oxide).

The polymer component may have the following ion conductive unit. The ion conductive unit may include, for example, a polyethylene oxide, a polypropylene oxide, a polymethacrylic acid ester, a polyacrylic acid ester, a polydimethylsiloxane, a polyacrylic acid, a polymethacrylic acid, a polyethylene vinyl acetate, a polyimide, a polyamine, a polyamide, a polyalkyl carbonate, a polynitrile, a polyphosphazene, a polyolefin, and a polydiene.

The weight average molecular weight (Mw) of the polymer component is not particularly limited, and is set to, for example, 1000000 or greater and 10000000 or less. The weight average molecular weight (Mw) is determined by gel permeation chromatography (GPC). In addition, the glass transition temperature (Tg) of the polymer component may be, for example, 60° C. or lower, 40° C. or lower, or 25° C. or lower. In addition, the polymer electrolyte may contain only one type of polymer component or two or more types thereof. Furthermore, the polymer electrolyte may be a cross-linked polymer electrolyte in which the polymer component is cross-linked, or may be an uncross-linked polymer electrolyte in which the polymer component is not cross-linked.

The polymer electrolyte may be a dry polymer electrolyte, or may be a gel electrolyte. The dry polymer electrolyte refers to an electrolyte having a content rate of a solvent component of 5% by weight or less. The content rate of the solvent component may be 3% by weight or less or 1% by weight or less. Note that, when a sulfide solid electrolyte having high reactivity with a polar solvent is used for the positive electrode active material layer, the dry polymer electrolyte is preferable.

The dry polymer electrolyte may contain a supporting electrolyte. The supporting electrolyte may include, for example, an inorganic lithium salt such as $LiPF_6$, $LiBF_4$, $LiClO_4$, and $LiAsF_6$, and an organic lithium salt such as $LiCF_3SO_3$, $LiN(CF_3SO_2)_2$, $LiN(C_2F_5SO_2)_2$, $LiN(FSO_2)_2$, and $LiC(CF_3SO_2)_3$. The proportion of the supporting electrolyte to the dry polymer electrolyte is not particularly limited. For example, when the dry polymer electrolyte has an EO unit (a $C_2H_5O$ unit), the EO unit may be, for example, 5 parts by mole or more, 10 parts by mole or more, or 15 parts by mole or more per 1 part by mole of the supporting electrolyte. Meanwhile, per 1 part by mole of the supporting electrolyte, the EO unit may be, for example, 40 parts by mole or less or 30 parts by mole or less.

The gel electrolyte typically contains an electrolytic solution component in addition to the polymer component. The electrolytic solution component contains a supporting electrolyte and a solvent. The supporting electrolyte has been described above. The solvent may include, for example, a carbonate. The carbonate may include, for example, a cyclic ester (a cyclic carbonate) such as an ethylene carbonate (EC), a propylene carbonate (PC), and a butylene carbonate (BC); and a chain ester (a chain carbonate) such as a dimethyl carbonate (DMC), a diethyl carbonate (DEC), and an ethyl methyl carbonate (EMC). In addition, the solvent may include, for example, acetates such as a methyl acetate and an ethyl acetate, and an ether such as a 2-methyltetrahydrofuran. Furthermore, the solvent may include, for example, γ-butyrolactone, sulfolane, N-methylpyrrolidone (NMP), and 1,3-dimethyl-2-imidazolidinone (DMI). In addition, the solvent may be water.

The proportion of the polymer electrolyte to all of the solid electrolytes may be, for example, 50% by volume or more, 70% by volume or more, or 90% by volume or more. The solid electrolyte may contain only the polymer electrolyte.

The proportion of the polymer electrolyte in the negative electrode active material layer may be, for example, 20% by volume or more, 30% by volume or more, or 40% by volume or more. Meanwhile, the proportion of the polymer electrolyte in the negative electrode active material layer may be, for example, 70% by volume or less or 60% by volume or less.

[Conductive Material]

The electron conductivity of the negative electrode active material layer is improved by adding the conductive material. The conductive material may include, for example, a particulate carbon material such as acetylene black (AB) and Ketjen black (KB), and a fibrous carbon material such as a carbon fiber, a carbon nanotube (CNT), and a carbon nanofiber (CNF).

[Binder]

By adding the binder, the constituent materials of the negative electrode active material layer are firmly bound. The binder may include, for example, a fluoride-based binder, a polyimide-based binder, and a rubber-based binder.

1.1c. Solid Electrolyte Layer

The solid electrolyte layer 13 is a layer containing a solid electrolyte, has a quadrilateral shape in plan view (as viewed from the viewpoint direction of FIG. 2), and contains a polymer electrolyte as the solid electrolyte in the present disclosure.

The polymer electrolyte contained in the solid electrolyte layer 13 is a cross-linked polymer electrolyte in which a polymer component is cross-linked. The polymer electrolyte contained in the solid electrolyte layer 13 is the same as the polymer electrolyte described in the negative electrode active material layer 12 above, except that the polymer component is cross-linked.

A polymerization initiator for cross-linking the polymer component may include, for example, a peroxide such as a benzoyl peroxide, a di-tert-butyl peroxide, a tert-butyl peroxybenzoate, a tert-butyl peroxyoctoate, and a cumene hydroxyperoxide; and an azo compound such as an azobisisobutyronitrile. The polymer electrolyte in the solid electrolyte layer and the polymer electrolyte in the negative electrode active material layer may have the same composition or may have different compositions. Note that, when a sulfide solid electrolyte having high reactivity with a polar solvent is used for the positive electrode active material layer, the dry polymer electrolyte is preferable.

Here, it is preferable that the solid electrolyte layer 13 is self-standing. The word "self-standing" means that the shape can be maintained even in the absence of any other support. For example, it can be said that the solid electrolyte layer is "self-standing" when a substrate is wet-coated with a material of the solid electrolyte as a subject the material is subjected to processes such as drying, and then the shape of the solid electrolyte layer is maintained even after peeling off the substrate.

It is preferable that the solid electrolyte layer 13 contains the polymer electrolyte as a main component of the solid electrolyte. In the solid electrolyte layer, the proportion of the polymer electrolyte to all of the solid electrolytes may be, for example, 50% by volume or higher, 70% by volume or higher, or 90% by volume or higher. The solid electrolyte layer may contain only the polymer electrolyte as the solid electrolyte.

The thickness (the size in the z-direction) of the solid electrolyte layer 13 is, for example, 0.1 μm or larger and 1000 μm or smaller.

1.1d. Positive Electrode Active Material Layer (Second Active Material Layer)

According to this embodiment, the positive electrode active material layer 14 is one member constituting a positive electrode stack as a second active material layer, and has a quadrilateral shape in plan view (as viewed from the viewpoint direction of FIG. 2). According to this embodiment, the positive electrode active material layer 14 contains at least a positive electrode active material and a solid electrolyte, and may further optionally contain a conductive material, a binder, and the like. Since the conductive material and the binder are the same as those described in the negative electrode active material layer 12, description thereof will be omitted here.

The thickness (the size in the z-direction) of the positive electrode active material layer is, for example, 0.1 μm or larger and 1000 μm or smaller.

[Positive Electrode Active Material]

The positive electrode active material may include, for example, an oxide active material. The oxide active material may include, for example, a rock-salt layered type active material such as $LiCoO_2$ and $LiNi_{1/3}Co_{1/3}Mn_{1/3}O_2$, a spinel type active material such as $LiMn_2O_4$ and $Li_4Ti_5O_{12}$, an olivine type active material such as $LiFePO_4$, and a sulfur-based active material such as S, $Li_2S$, and a transition metal sulfide.

A protective layer containing a Li ion conductive oxide may be formed on a surface of the oxide active material. This is because the reaction between the oxide active material and the solid electrolyte can be suppressed. The Li ion conductive oxide may include, for example, $LiNbO_3$. The thickness of the protective layer is, for example, 1 nm or larger and 30 nm or smaller.

The shape of the positive electrode active material may include, for example, a particulate shape. The average particle size (D50) of the positive electrode active material is not particularly limited, and may be, for example, 10 nm or larger or 100 nm or larger. Meanwhile, the average particle size (D50) of the positive electrode active material may be, for example, 50 μm or smaller or 20 μm or smaller.

[Solid Electrolyte]

As the solid electrolyte of the positive electrode active material layer, an inorganic solid electrolyte may be used. The inorganic solid electrolyte may include, for example, a sulfide solid electrolyte, an oxide solid electrolyte, and a halide solid electrolyte. In addition, the inorganic solid electrolyte may include glass (an amorphous body), glass ceramics, or a crystal. The glass is obtained, for example, by amorphizing a raw material. The glass ceramics are obtained, for example, by performing heat treatment on glass. The crystal is obtained, for example, by heating the raw material.

The sulfide solid electrolyte preferably contains, for example, Li, A (where A is at least one selected from the group consisting of P, As, Sb, Si, Ge, Sn, B, Al, Ga, and In), and S. The sulfide solid electrolyte may further contain at least one selected from the group consisting of O (oxygen)

and halogen. The halogen may include, for example, F, Cl, Br, and I. The sulfide solid electrolyte may contain only one type of halogen, or may contain two or more types of halogen. In addition, when the sulfide solid electrolyte contains an anionic element other than S (e.g., O and halogen), it is preferable that the molar ratio of S is the highest of all of the anionic elements.

It is preferable that the sulfide solid electrolyte has an anionic structure having an ortho composition (such as a $PS_4^{3-}$ structure, a $SiS_4^{4-}$ structure, a $GeS_4^{4-}$ structure, an $AlS_3^{3-}$ structure, and a $BS_3^{3-}$ structure) as a main component of the anionic structure. This is because it has high chemical stability. The proportion of the anionic structure having the ortho composition to all of the anionic structures in the sulfide solid electrolyte may be, for example, 50 mol % or higher, 60 mol % or higher, or 70 mol % or higher.

The sulfide solid electrolyte may contain a crystalline phase having ionic conductivity. The crystalline phase described above may include, for example, a Thio-LISICON type crystalline phase, a LGPS type crystalline phase, and an argyrodite type crystalline phase.

In addition, it is preferable that the oxide solid electrolyte contains, for example, Li, Z (where Z is at least one selected from the group consisting of Nb, B, Al, Si, P, Ti, Zr, Mo, W, and S), and O. Specifically, the oxide solid electrolyte may include, for example, a garnet type solid electrolyte such as $Li_7La_3Zr_2O_{12}$; a perovskite type solid electrolyte such as $(Li,La)TiO_3$; a nasicon type solid electrolyte such as $Li(Al, Ti)(PO_4)_3$; a Li—P—O-based solid electrolyte such as $Li_3PO_4$; and a Li—B—O-based solid electrolyte such as $Li_3BO_3$. In addition, when the oxide solid electrolyte contains an anionic element other than O (e.g., S and halogen), it is preferable that the molar ratio of O is the highest of all of the anionic elements.

The halide solid electrolyte is an electrolyte containing halogen (X). The halogen may include, for example, F, Cl, Br, and I. The halide solid electrolyte may include, for example, $Li_3YX_6$ (where X is at least one selected from the group consisting of F, Cl, Br, and I). In addition, when the halide solid electrolyte contains an anionic element other than halogen (e.g., S and O), it is preferable that the molar ratio of halogen is the highest of all of the anionic elements.

The shape of the inorganic solid electrolyte may include, for example, a particulate shape. The average particle size (D50) of the inorganic solid electrolyte is not particularly limited, and may be, for example, 10 nm or larger or 100 nm or larger. Meanwhile, the average particle size (D50) of the inorganic solid electrolyte may be, for example, 50 μm or smaller or 20 μm or smaller.

It is preferable that the positive electrode active material layer 14 contains the inorganic solid electrolyte as a main component of the solid electrolyte. In the positive electrode active material layer 14, the proportion of the inorganic solid electrolyte to all of the solid electrolytes may be, for example, 50% by volume or higher, 70% by volume or higher, or 90% by volume or higher. The positive electrode active material layer 14 may contain only the inorganic solid electrolyte as the solid electrolyte.

The proportion of the inorganic solid electrolyte in the positive electrode active material layer 14 may be, for example, 10% by volume or higher or 20% by volume or higher. Meanwhile, the proportion of the inorganic solid electrolyte in the positive electrode active material layer 14 may be, for example, 60% by volume or lower or 50% by volume or lower.

1.1e. Positive Electrode Current Collector Layer (Second Current Collector Layer)

According to this embodiment, the positive electrode current collector layer 15 is one of members constituting the positive electrode stack as a second current collector layer, has a quadrilateral shape in plan view (as viewed from the viewpoint direction of FIG. 2), and may be formed of metal foil, metal mesh, or the like. Particularly, the metal foil is preferable, and the metal may include Ni, Cr, Au, Pt, Al, Fe, Ti, Zn, stainless steel, and the like. The positive electrode current collector layer 15 may have any coat layer such as a carbon coat layer on its surface for adjusting electric resistance. The thickness (the size in the z-direction) of the positive electrode current collector layer 15 is not particularly limited. For example, the thickness is preferably 0.1 μm or larger and 1 mm or smaller, and more preferably 1 μm or larger and 100 μm or smaller.

The positive electrode current collector layer 15 includes a positive electrode current collector tab 15a as a second current collector tab. The positive electrode current collector tab 15a makes it possible to easily electrically connect the positive electrode current collector layers 15 to each other. The positive electrode current collector tab 15a may be made of the same material as that of the positive electrode current collector layer 15, or may be made of a different material. Furthermore, the positive electrode current collector tab 15a may have the same thickness as that of the positive electrode current collector layer 15 or may have a different thickness.

According to this embodiment, the positive electrode current collector tab 15a is arranged so as to protrude in the x-direction from one side (the edge in the x-direction) of the positive electrode current collector layer 15, and has the same thickness as that of the positive electrode current collector layer 15. Furthermore, the positive electrode current collector tab 15a has a width (size in the y-direction) smaller than that of the positive electrode current collector layer 15.

1.1f. Insulating Layer

The insulating layer 16 is a layer made of an electrical insulator. The insulating layer 16 may be applied without particular limitation as long as it is a member capable of providing electrical insulation. For example, the insulating layer 16 may include an insulating film, an insulating tape, and the like.

1.2. Structure of the Power Generating Element

According to this embodiment, each of the constituent members described above are arranged as follows so as to provide the power generating element 10.

The first active material layer is arranged on each of the front and back of the first current collector layer. That is, according to this embodiment, the negative electrode active material layer 12 is arranged on each of the front and back of the negative electrode current collector layer 11. In this case, as recognized from FIGS. 5 and 6, an end surface 12t of the negative electrode active material layer 12 is configured so as to be inward (so as not to protrude) with respect to an end surface 11t of the negative electrode current collector layer 11.

The solid electrolyte layer is arranged on a surface of the first active material layer opposite to a surface coming into contact with the first current collector layer. According to this embodiment, the solid electrolyte layer 13 is arranged on a surface of the negative electrode active material layer 12 opposite to a surface coming into contact with the negative electrode current collector layer 11.

In addition, according to this embodiment, as recognized from FIGS. 5 and 6, at three sides other than the side where the negative electrode current collector tab 11a as the first current collector tab is arranged, the end surface 11t of the negative electrode current collector layer 11 as the first current collector layer and the end surface 12t of the negative electrode active material layer 12 as the first active material layer are covered with the solid electrolyte layer 13. As a result, for example, even when the negative electrode active material layer 12 is deformed during pressing or the like using a soft polymer electrolyte, the negative electrode active material layer 12 is covered with the solid electrolyte layer 13, so that it is possible to suppress a short circuit that may occur when the negative electrode active material layer 12 makes contact with the positive electrode active material layer 14 or the positive electrode current collector layer 15.

Note that, according to this embodiment, the end surface 11t of the negative electrode current collector layer 11 on which the negative electrode current collector tab 11a is provided is arranged so as to protrude from the end surface 12t of the negative electrode active material layer 12 and an end surface of the solid electrolyte layer 13 (see FIG. 6).

The positive electrode active material layer 14 as the second active material layer is arranged on a surface of the solid electrolyte layer 13 opposite to a surface coming into contact with the surface of the negative electrode active material layer 12 as the first current collector layer. Further, the positive electrode current collector layer 15 as the second current collector layer is arranged on a surface of the positive electrode active material layer 14 as the second active material layer opposite to a surface coming into contact with the solid electrolyte layer 13.

In addition, according to this embodiment, the negative electrode current collector tab 11a and the positive electrode current collector tab 15a are arranged so as to protrude in the same direction. However, as recognized from FIGS. 2 and 4, the negative electrode current collector tab 11a and the positive electrode current collector tab 15a are arranged such that their positions are different in the width direction (the y-direction) and are positioned so as not to overlap as seen from the viewpoint of FIG. 2 (in plan view).

In addition, the insulating layer 16 is arranged on the front and back of the negative electrode current collector layer 11 at a portion of the negative electrode current collector layer 11 where a portion protruding in the x-direction and the positive electrode current collector tab 15a overlap in plan view. As a result, it is possible to more reliably suppress a short circuit.

This embodiment has been described by assuming that the word "first" is designated as the negative electrode, and the word "second" is designated as the positive electrode. That is, the arrangement of each component has been described by assuming that the first current collector layer is the negative electrode current collector layer, the first current collector tab is the negative electrode current collector tab, the first active material layer is the negative electrode active material layer, the second current collector layer is the positive electrode current collector layer, the second current collector tab is the positive electrode current collector tab, and the second active material layer is the positive electrode active material layer. Alternatively, without limiting the designation thereto, the arrangement of each component may be described by assuming that the word "first" is designated as the positive electrode, and the word "second" is designated as the negative electrode. The same applies to the following description.

1.3. Method of Fabricating the Power Generating Element

A method of fabricating the power generating element 10 is not particularly limited, and the power generating element 10 may be fabricated, for example, as follows.

The positive electrode stack (a stack of the positive electrode current collector layer 15 and the positive electrode active material layer 14) is obtained by wet-coating a surface of the positive electrode current collector layer 15 with a material serving as the positive electrode active material layer 14 and drying the material to densify it through pressing.

Meanwhile, the negative electrode stack (a stack of the negative electrode current collector layer 11 and the negative electrode active material layer 12) is obtained by wet-coating front and back surfaces of the negative electrode current collector layer 11 with a material serving as the negative electrode active material layer 12 and drying the material to densify it through pressing.

The solid electrolyte layer is arranged so as to cover the negative electrode stack, and the positive electrode stack is arranged on each of both outer surfaces of the solid electrolyte layer. Then, press-molding for integration is performed to obtain the power generating element 10. The pressing pressure at this time is not particularly limited, but is preferably set to, for example, 0.5 t/cm$^2$ or higher.

Figure 7:
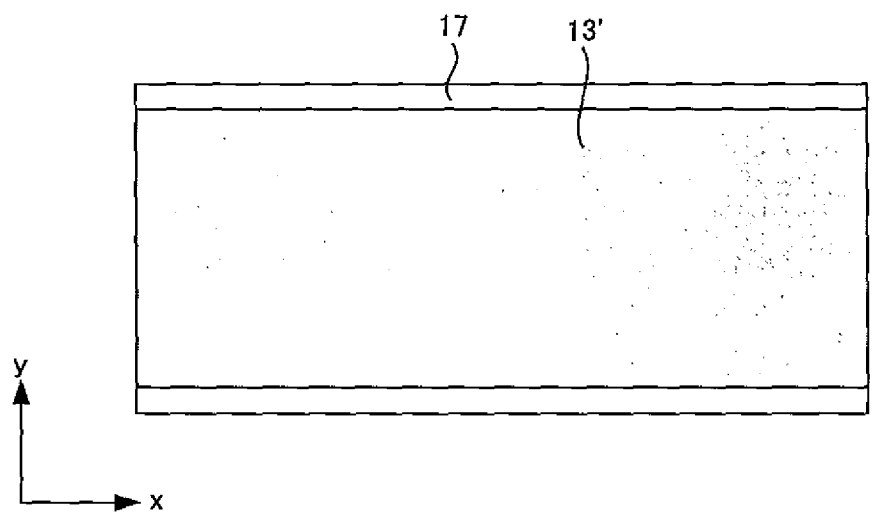
FIG. 7 is a diagram illustrating an example in which a negative electrode stack is coated with a solid electrolyte layer.
Figure 7:
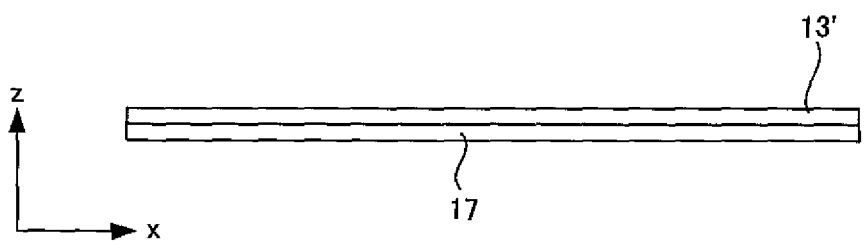
Figure 8:
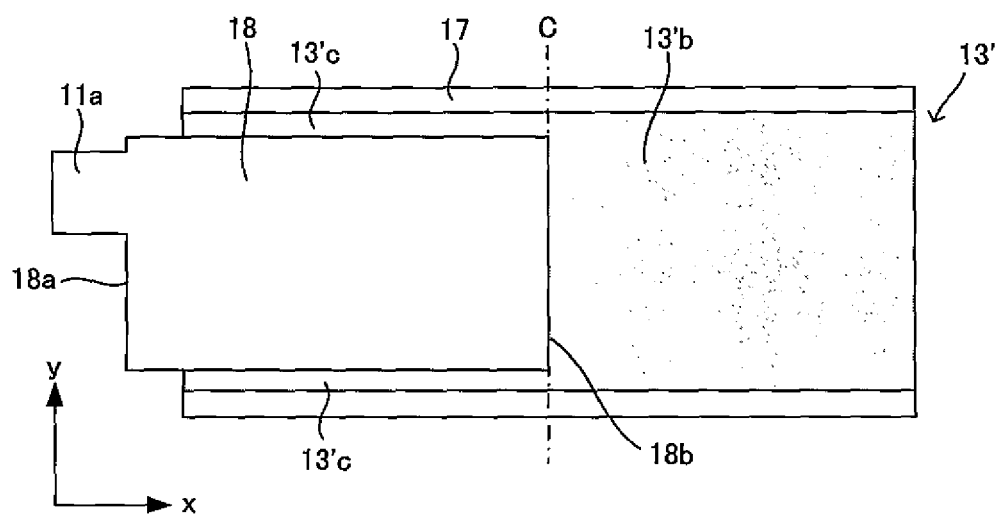
FIG. 8 is a diagram illustrating an example in which the negative electrode stack is coated with the solid electrolyte layer.
Figure 8:
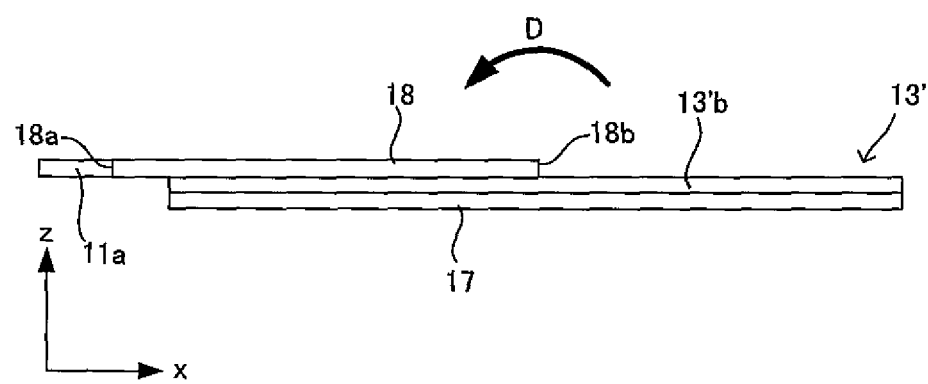
Figure 9:
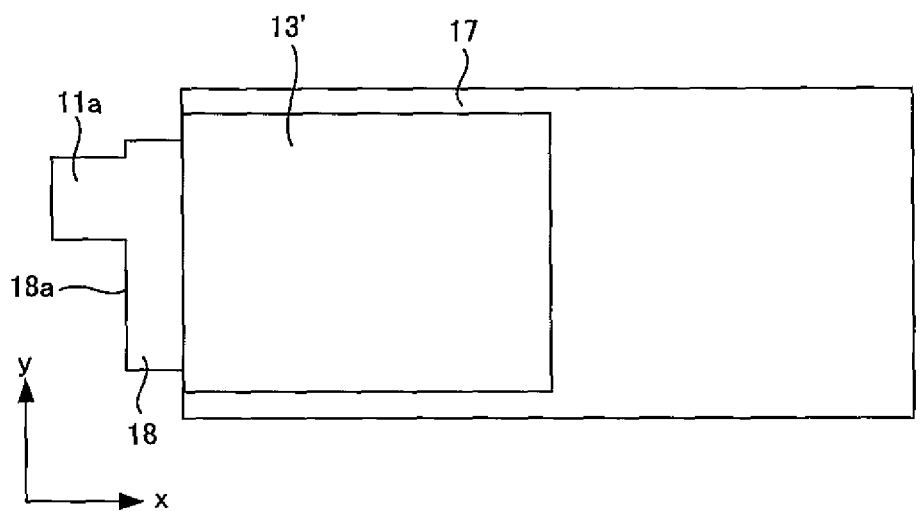
FIG. 9 is a diagram illustrating an example in which the negative electrode stack is coated with a solid electrolyte layer.
Figure 9:
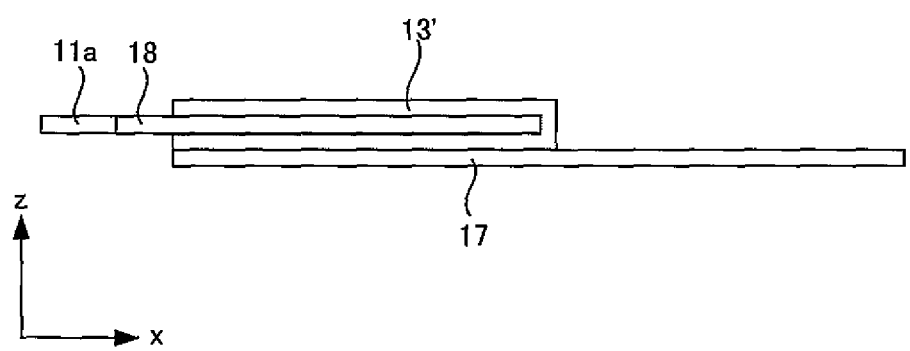

Here, a method of arranging the solid electrolyte layer so as to cover the negative electrode stack is not particularly limited, and may be performed, for example, as follows. FIGS. 7 to 9 are diagrams for explanation. In FIGS. 7 to 9, a plan view is shown at the top, and a view (a cross section taken along the center in the y-direction) for showing a stacking state in the thickness direction is shown at the bottom.

First, as shown in FIG. 7, a material 13' serving as the solid electrolyte layer is laminated on a release sheet (e.g., a polyethylene terephthalate sheet and a PET sheet) 17.

Next, as shown in FIG. 8, a negative electrode stack 18 is further laminated on the material 13'. In this case, the negative electrode stack 18 is arranged such that one end 18a in the x-direction protrudes from an end of the material 13', and the other end 18b in the x-direction of the negative electrode stack 18 is arranged at a position approximately corresponding to a centerline C of the material 13' in the x-direction. In addition, the length of the negative electrode active material layer of the negative electrode stack 18 in the x-direction is set to approximately half of the length of the solid electrolyte layer in the x-direction. In addition, the width of the negative electrode stack 18 is made smaller than the width of the material 13' in the width direction (the y-direction), and a portion 13'c where the material 13' is exposed is formed at both ends of the material 13' in the width direction (the y-direction).

From the posture of FIG. 8, as indicated by arrow D in FIG. 8, the material 13' is laminated on the negative electrode stack 18 by doing a valley fold of the release sheet 17 and the material 13' on a side where the negative electrode stack 18 is not laminated along the centerline C. Then, the state of FIG. 9 is obtained by removing the release sheet 17 of the folded portion. That is, the material 13' is wound around front and back surfaces of the negative electrode stack 18 in the posture of FIG. 9 to form a pouch-shaped material 13'.

As a result, the solid electrolyte layer can be arranged so as to cover the negative electrode stack. Note that, although the upper and lower materials 13' formed by folding are bonded together by contact because they are easily bondable, physical bonding or welding by pressing, or chemical bonding using a cross-linking reaction by ultraviolet irradiation or heating may also be performed.

Here, an example has been described in which the material serving as the solid electrolyte layer is folded to cover the negative electrode stack. However, without limiting the method thereto, the solid electrolyte layer may be arranged so as to cover the negative electrode stack by preparing two sheet-like materials serving as the solid electrolyte layer and arranging and bonding the negative electrode stack therebetween. Furthermore, a release sheet such as a PET film may be arranged instead of the negative electrode stack 18 to form a pouch-shaped solid electrolyte layer. Then, the release sheet may be removed, and the negative electrode stack may be arranged.

2. Solid-State Battery

Figure 10:
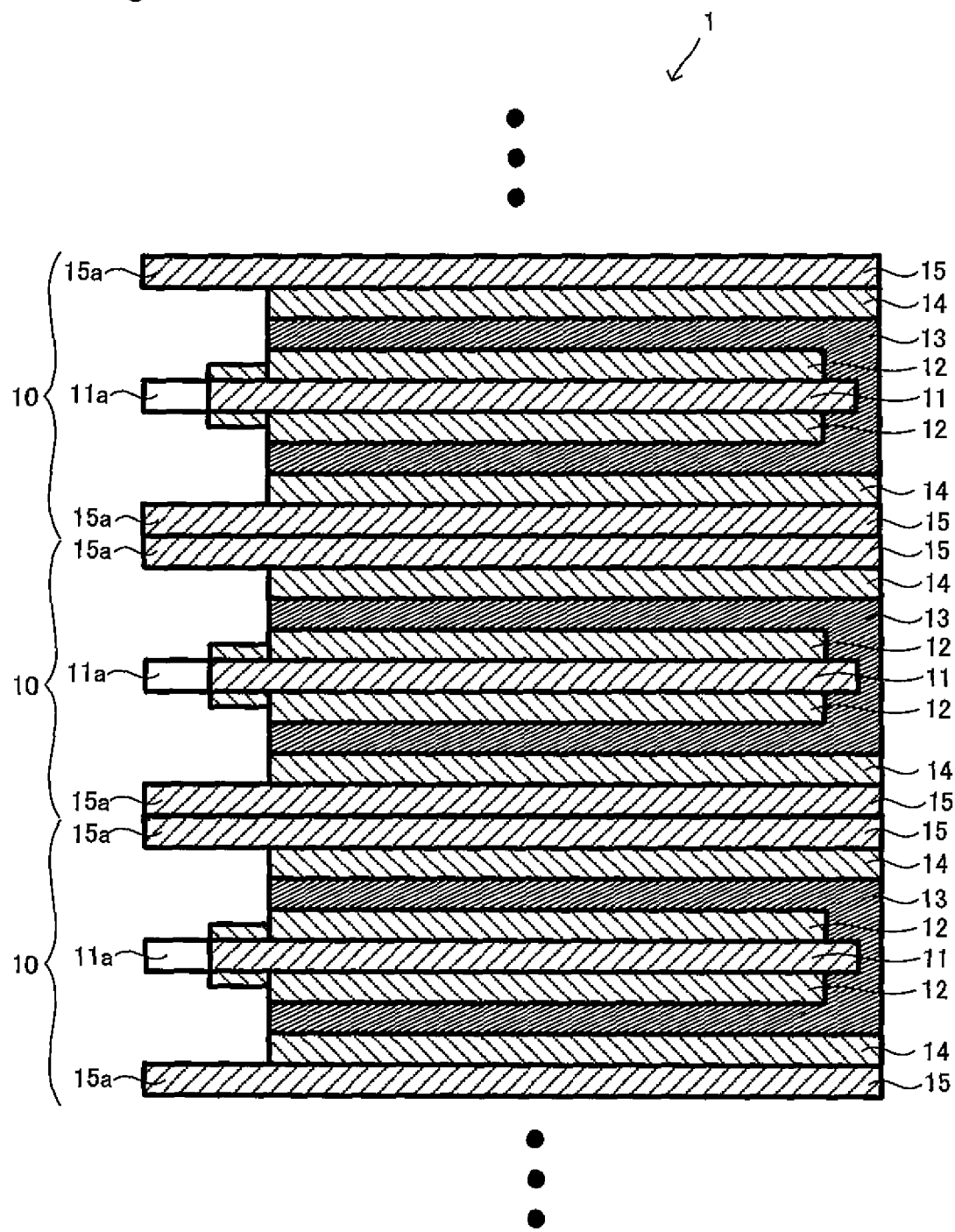
FIG. 10 is a diagram illustrating a configuration of a solid-state battery 1.

The solid-state battery according to the present disclosure is formed by stacking the power generating elements 10 described above. FIG. 10 is a diagram for explanation. As recognized from FIG. 10, in the solid-state battery, the power generating elements 10 are stacked by overlapping the positive electrode current collector layers 15 and the positive electrode current collector tabs 15a of the power generating elements 10. In addition, a plurality of negative electrode current collector tabs 11a are electrically connected, and a plurality of positive electrode current collector tabs 15a are electrically connected to form the positive and negative electrodes of the solid-state battery. Furthermore, in the solid-state battery, the stacked power generating elements 10 are housed in the exterior casing. The exterior casing may include, for example, a laminate type exterior casing and a can type exterior casing.

The solid-state battery according to the present disclosure is typically a solid-state lithium-ion secondary battery. Applications of the solid-state battery are not particularly limited, and may include, for example, a power supply for a vehicle such as a hybrid vehicle (HEV), an electric vehicle (BEV), a gasoline vehicle, and a diesel vehicle. In particular, the solid-state battery is preferably used for a driving power supply for a hybrid vehicle or an electric vehicle. In addition, the solid-state battery according to the present disclosure may be used as a power supply for a mobile entity other than a vehicle (e.g., a railway, a ship, and an aircraft), or may be used as a power supply for an electrical product such as an information processing device.

3. Other Embodiments

3.1. Alternative Embodiment 1

Figure 11:
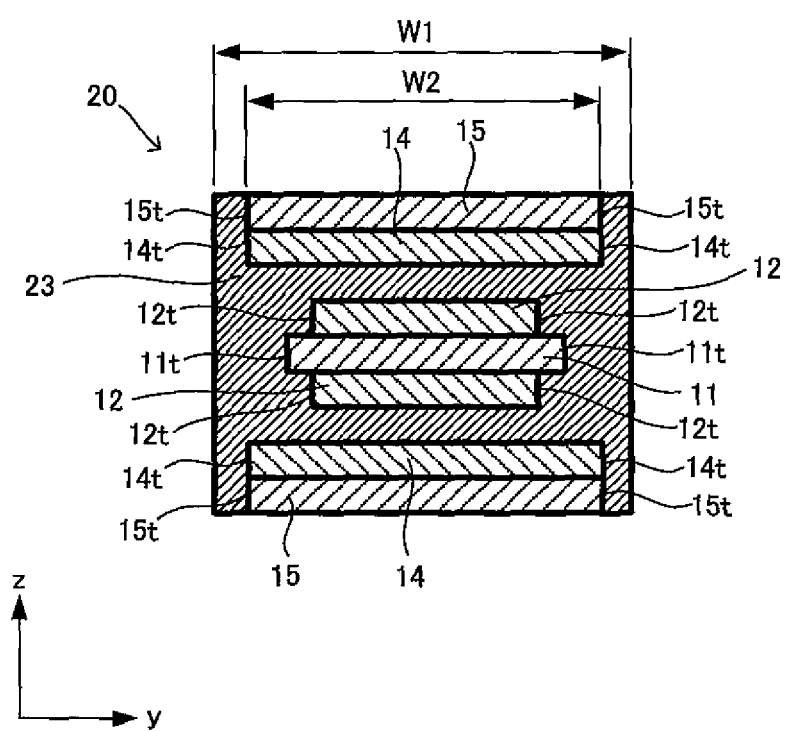
FIG. 11 is a cross-sectional view illustrating a power generating element 20.
Figure 12:
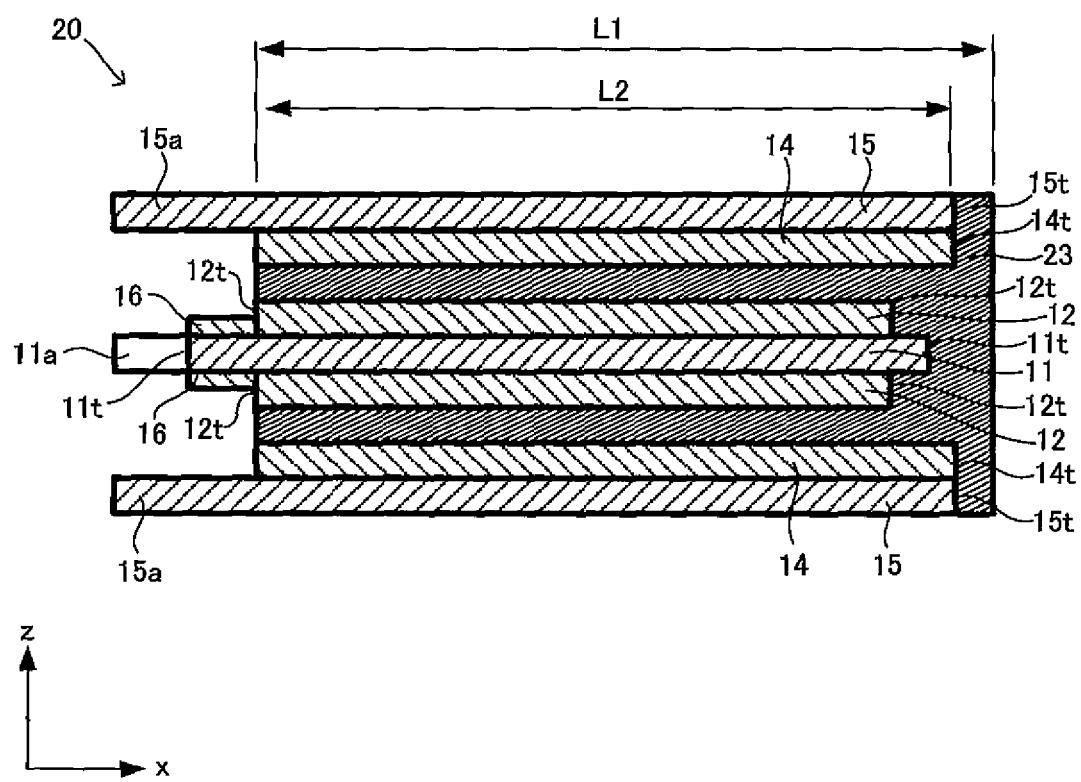
FIG. 12 is a cross-sectional view illustrating the power generating element 20.
Figure 13:
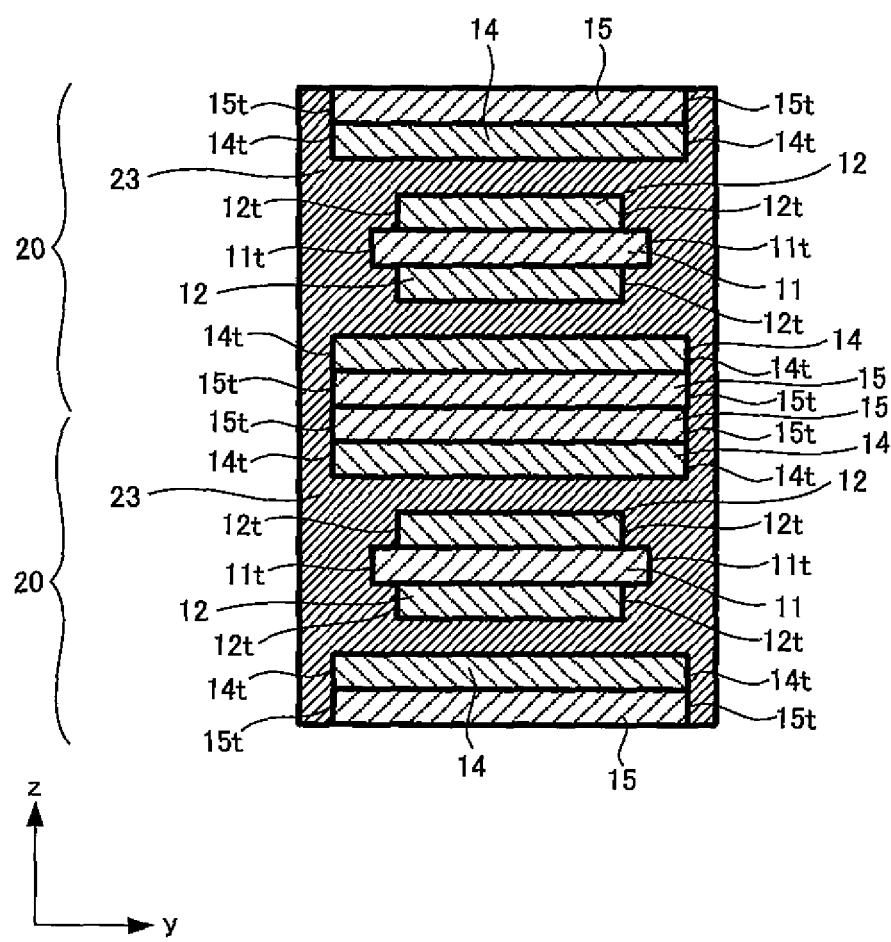
FIG. 13 is a diagram illustrating an embodiment in which the power generating elements 20 are stacked.

FIGS. 11 to 13 illustrate power generating elements 20 used in a solid-state battery according to Alternative Embodiment 1. FIG. 11 is a diagram as seen from the same viewpoint as that of FIG. 5, and FIG. 12 is a diagram as seen from the same viewpoint as that of FIG. 6.

In the power generating element 20, a solid electrolyte layer 23 is applied instead of the solid electrolyte layer 13 of the power generating element 10. Since other components are similar to those of the power generating element 10, the same reference numerals will be used herein, and description thereof will be omitted.

In addition to the configuration of the solid electrolyte layer 13 of the power generating element 10, the solid electrolyte layer 23 has a width (W1 in FIG. 11) and a length (L1 in FIG. 12) of the solid electrolyte layer covering the end surfaces (11t and 12t) of the first current collector layer (the negative electrode current collector layer 11) and the first active material layer (the negative electrode active material layer 12) larger than the width (W2 in FIG. 11) and the length (L2 in FIG. 12) of the second current collector layer (the positive electrode current collector layer 14) and the second active material layer (the positive electrode active material layer 15) in at least one side other than the side where the first current collector tab (the negative electrode current collector tab 11a) is arranged. Furthermore, at the larger portion, an end surface of the second active material layer (an end surface 14t of the positive electrode active material layer 14) and an end surface of the second current collector layer (an end surface 15t of the positive electrode current collector layer 15) are also covered with the solid electrolyte layer 23. As a result, it is possible to further prevent a short circuit.

In addition, as shown in FIG. 13, two or more power generating elements 20 may be structured by bonding the solid electrolyte layers covering the end surfaces of the first current collector layer, the first active material layer, the second current collector layer, and the second active material layer to each other on a side other than sides where the first current collector tab (the negative electrode current collector tab 11a) and the second current collector tab (the positive electrode current collector tab 15a) are arranged. As a result, it is possible to obtain integration and suppress positional deviation and the like.

3.2. Alternative Embodiment 2

Hereinbefore, an example has been described in which, in the case of the power generating element 10, all sides of the negative electrode current collector layer 11 and the negative electrode active material layer 12, and in the case of the power generating element 20, all sides of the positive electrode current collector layer 15 and the positive electrode active material layer 14 in addition thereto other than the sides where the negative electrode current collector tab 11a and the positive electrode current collector tab 15a are arranged are covered with the solid electrolyte layer, and the negative electrode current collector tab 11a and the positive electrode current collector tab 15a are arranged in the same direction.

However, the present disclosure is not limited thereto, and the negative electrode current collector tab 11a and the positive electrode current collector tab 15a may be arranged in different directions.

That is, the solid electrolyte layer may include a first current collector layer having a first current collector tab protruding from one side, a first active material layer laminated on the first current collector layer, a second current collector layer having a second current collector tab protruding from one side (not limited to a side at the same position as that of the first current collector tab), a second active material layer laminated on the second current collector layer, and a solid electrolyte layer arranged between the first active material layer and the second active material layer and including a polymer electrolyte, and the solid electrolyte layer may be arranged so as to cover end surfaces of the first current collector layer and the first active material layer on three sides other than a side where the first tab is arranged.

In addition, on one or more sides other than the side where at least the first current collector tab is arranged, the width and the length of the solid electrolyte layer covering the end surfaces (11t and 12t) of the first current collector layer (the negative electrode current collector layer 11) and the first active material layer (the negative electrode active material layer 12) are larger than the width and the length of the second current collector layer (the positive electrode current collector layer 14) and the second active material layer (the positive electrode active material layer 15), and the solid electrolyte layer of the power generating element is also configured to cover an end surface of the second active material layer (an end surface 14t of the positive electrode active material layer 14) and an end surface of the second current collector layer (an end surface 15t of the positive electrode current collector layer 15). In addition, on a side other than the side where the first current collector tab (the negative electrode current collector tab 11a) and the second current collector tab (the positive electrode current collector tab 15a) are arranged, two or more power generating elements may be structured by bonding the solid electrolyte layers covering end surfaces of the first current collector layer, the first active material layer, the second current collector layer, and the second active material layer to each other.

4. Advantageous Effects

In the power generating element and the solid-state battery using the same according to the present disclosure, in order to suppress degradation of the battery performance caused by expansion and contraction of the negative electrode active material, a soft polymer electrolyte is used as the solid electrolyte of the negative electrode layer. Therefore, it is possible to suppress degradation of battery performance caused by expansion and contraction of the negative electrode active material during charging and discharging.

In addition, in the power generating element and the solid-state battery using the same according to the present disclosure, the three sides of the end surface of the first current collector layer (the negative electrode current collector layer) and the end surface of the first active material layer (the negative electrode active material layer) other than the side where the first current collector tab (the negative electrode current collector tab) is arranged are covered with the solid electrolyte layer. As a result, even when the negative electrode active material layer is deformed during pressing or the like using the soft polymer electrolyte, it is possible to suppress a short circuit that may occur when the negative electrode active material layer makes contact with the positive electrode active material layer or the positive electrode current collector layer because the negative electrode active material layer is covered with the solid electrolyte layer. Since no short circuit occurs, it is possible to suppress peeling or cracking inside the negative electrode layer or at the interface between the negative electrode layer and the solid electrolyte layer during charging and discharging, and obtain excellent cycle characteristics.

5. Examples 5.1. Fabrication of a Solid-State Battery of Example 1

5.1a. Fabrication of a Negative Electrode Stack

A negative electrode active material (Si-particles having an average particle size of 2.5 μm), a conductive material (VGCF-H produced by Showa Denko K.K., where VGCF is a registered trademark), and a binder (PVdF-HFP) were weighed to have a weight ratio of negative electrode active material:conductive material:binder=94:4:2, and were mixed with a dispersion medium (diisobutyl ketone). The obtained mixture was dispersed by an ultrasonic homogenizer (UH-50 produced by SMT Co., Ltd.) to obtain negative electrode slurry. A negative electrode current collector layer (Ni foil having a thickness of 15 μm) was coated with the obtained negative electrode slurry by a blade coating method using an applicator, and the slurry was dried at 100° C. for 30 minutes. Then, the coating was similarly performed on the opposite surface of the negative electrode current collector layer to obtain an intermediate in which the negative electrode active material layer is laminated on both surfaces of the negative electrode active material layer and the negative electrode current collector layer.

In addition, PEO (polyethylene oxide, Mw=about 4,000,000) and LiTFSI (LiN $(SO_2CF_3)_2$) were weighed to have a molar ratio of EO:Li=20:1, were mixed with acetonitrile, and were stirred until a homogeneous solution was obtained. The aforementioned intermediate was coated with the resulting PEO-LiTFSI solution by the blade coating method using an applicator, and the solution was dried at 100° C. for 60 minutes. Then, coating was similarly performed on the opposite surface of the negative electrode current collector layer. Note that, after the drying, a gap of a blade was adjusted such that a weight ratio of negative electrode active material:polymer electrolyte=68:32 is obtained. Then, a negative electrode stack was obtained in which the negative electrode active material layer was arranged on each of both surfaces of the negative electrode current collector layer through densification by pressing.

5.1b. Fabrication of a Positive Electrode Material Layer

A positive electrode active material ($LiNi_{0.8}Co_{0.15}Al_{0.05}O_2$ having an average particle size of 10 μm) coated with $LiNbO_3$ by using a rolling flow type granulation coating device, a sulfide solid electrolyte ($10LiI \cdot 15LiBr \cdot 75(0.75Li_2S \cdot 0.25P_2S_5)$) (mol %) having an average particle size of 0.5 μm), a conductive material (VGCF-H produced by Showa Denko K.K.), and a binder (SBR) were weighed to have a weight ratio of positive electrode active material:sulfide solid electrolyte:conductive material:binder=85:13:1:1", and were mixed with the dispersion medium (diisobutyl ketone). The obtained mixture was dispersed by the ultrasonic homogenizer (UH-50, produced by SMT Co., Ltd.) to obtain positive electrode slurry. An Al foil (having a thickness of 15 μm) was coated with the obtained positive electrode slurry by the blade coating method using an applicator, and the slurry was dried at 100° C. for 30 μminutes, and was densified by pressing to obtain a positive electrode mixture in which the positive electrode active material layer is laminated on the Al foil.

5.1c. Fabrication of a Solid Electrolyte Layer

PEO (polyethylene oxide, Mw=about 4,000,000) and LiTFSI (LiN $(SO_2CF_3)_2$) were weighed to have a molar ratio of EO:Li=20:1, and were mixed with acetonitrile. Into this solution, an initiator BPO (benzoyl peroxide) was mixed to obtain 10 wt % of a PEO-LiTFSI solution, and then was stirred until a homogeneous solution was obtained. A PET film was coated with the produced polymer electrolyte solution by the blade coating method using an applicator so as to have a width of 7.4 cm, and the solution was dried at 100° C. for 60 minutes. Then, it was cut so as to have a length of 14.0 cm. As a result, a self-standing cross-linked type solid electrolyte layer was obtained.

5.1d. Fabrication of a Solid-State Battery

The negative electrode stack and the solid electrolyte layer cut out in a size of 7.0 cm×7.0 cm were laminated by bonding them such that the negative electrode stack and the solid electrolyte layer come into direct contact with each other and an end surface opposite to the negative electrode current collector tab matches with the center of the solid electrolyte layer, and bending the solid electrolyte layer in the longitudinal direction. Subsequently, the positive electrode mixture cut out in a size of 7.0 cm×7.0 cm was bonded such that the positive electrode mixture and the solid electrolyte layer make direct contact with each other, and was pressed by 0.5 t/cm². In addition, after welding each terminal, laminate cellularization (enclosed in the exterior casing) was performed to fabricate a solid-state battery.

5.2. Fabrication of a Solid-State Battery of Example 2

The same procedure as that of Example 1 was applied to the procedure before fabrication of a solid-state battery described below.

5.2a. Fabrication of a Solid-State Battery

Two power generating elements obtained in Example 1 were stacked, and the electrodes were fixed by bonding the solid electrolyte layer in a side not facing the current collector tab side. After welding each terminal, laminate cellularization (enclosed in the exterior casing) was performed to fabricate a solid-state battery.

5.3. Fabrication of Solid-State Battery of Comparative Example 1

The procedure similar to that of Example 1 was applied to fabrication of the following solid-state battery.

5.3a. Fabrication of a Solid-State Battery

A negative electrode stack cut out in a size of 7.2 cm×7.2 cm and a solid electrolyte layer cut out in a size of 7.2 cm×7.2 cm were bonded to each other such that the negative electrode mixture layer and the solid electrolyte layer make a direct contact with each other, and current collecting side end surfaces match with each other. Then, the solid electrolyte was bonded by peeling off the PET film. Subsequently, the positive electrode mixture cut out in a size of 7.0 cm×7.0 cm was bonded such that a positive electrode mixture and the solid electrolyte layer make direct contact with each other, and pressing was performed by 0.5 t/cm². In addition, after welding each terminal, laminate cellularization (enclosed in the exterior casing) was performed to fabricate a solid-state battery.

5.4. Fabrication of a Solid-State Battery of Comparative Example 2

The same procedure as that of Comparative Example 1 was applied to the procedure before fabrication of a solid-state battery described below.

5.4a. Fabrication of a Solid-State Battery

Two power generating elements obtained in Comparative Example 1 were stacked. After welding each terminal, laminate cellularization was performed to fabricate a solid-state battery.

5.5. Evaluation and Results

For each of the solid-state batteries resulting from Example 1, Example 2, Comparative Example 1, and Comparative Example 2, the voltage of ten samples was measured using a tester to evaluate a short-circuit rate. It was determined that a sample made a short circuit when the measured voltage was 0 V. Otherwise, it was determined that a sample did not make a short circuit when the measured voltage was higher than 0 V.

As a result, there was no short circuit in nine samples of Example 1 and eight samples of Example 2. Meanwhile, there was no short circuit in six samples of Comparative Example 1 and only two samples of Comparative Example 2. There were short circuits in the other samples of the comparative examples.

REFERENCE SIGNS LIST

1 solid-state battery
10 power generating element
11 negative electrode current collector layer
11a negative electrode current collector tab
12 negative electrode active material layer
13 solid electrolyte layer
14 positive electrode active material layer
15 positive electrode current collector layer
15a positive electrode current collector tab
16 insulating layer

The invention claimed is:
1. A method for producing a solid-state battery, the method comprising:
   laminating a solid electrolyte layer on a release sheet;
      preparing a current collector layer, and an electrode stack that is formed by laminating active material layers on a front and a back of the current collector layer;
      laminating the electrode stack on the solid electrolyte layer on one half side of the solid electrolyte layer so that one end of the electrode stack protrudes from an end of the solid electrolyte layer, and another end of the electrode stack is arranged on a center position of the solid electrolyte layer; and
      folding the release sheet and a material of the solid electrolyte layer so as to form a valley along a center line of the solid electrolyte layer to cover, over the electrode stack, another half side of the solid electrolyte layer where the electrode stack is not laminated, so that the electrode stack is sandwiched by the solid electrolyte layer, wherein
      the electrode stack except a protruding portion thereof is covered with the solid electrolyte layer.

2. The method according to claim 1, wherein a current collector tab is arranged on the one end of the electrode stack protruding from the end of the solid electrolyte layer.

3. A method for producing a solid-state battery, the method comprising:
  laminating a solid electrolyte layer on a release sheet;
  preparing a negative electrode current collector layer, and a negative electrode stack that is formed by laminating negative electrode active material layers on a front and a back of the negative electrode current collector layer;
  laminating the negative electrode stack on the solid electrolyte layer on one half side of the solid electrolyte layer so that one end of the negative electrode stack protrudes from an end of the solid electrolyte layer, and another end of the negative electrode stack is arranged on a center position of the solid electrolyte layer; and
  folding the release sheet and a material of the solid electrolyte layer so as to form a valley along a center line of the solid electrolyte layer to cover, over the negative electrode stack, another half side of the solid electrolyte layer where the negative electrode stack is not laminated, so that the negative electrode stack is sandwiched by the solid electrolyte layer, wherein
  the negative electrode stack except a protruding portion thereof is covered with the solid electrolyte layer, and
  a positive electrode stack that is formed by laminating positive electrode active material layers on a front and a back of a positive electrode current collector layer is stacked on a surface of the solid electrolyte layer on which the negative electrode stack is not arranged.

4. The method according to claim 3, wherein a negative electrode current collector tab is arranged on the one end of the negative electrode stack protruding from the end of the solid electrolyte layer.

* * * * *